(12) United States Patent
Yang et al.

(10) Patent No.: US 7,643,272 B2
(45) Date of Patent: Jan. 5, 2010

(54) FASTENER AND DISPLAY OF PORTABLE COMPUTER USING THE SAME

(75) Inventors: Hyun Suk Yang, Suwon-si (KR); Lai O Kang, Osan-si (KR)

(73) Assignee: LG Electronics Inc., Seoul (KR)

( * ) Notice: Subject to any disclaimer, the term of this patent is extended or adjusted under 35 U.S.C. 154(b) by 621 days.

(21) Appl. No.: 11/322,332

(22) Filed: Jan. 3, 2006

(65) Prior Publication Data

US 2006/0209522 A1    Sep. 21, 2006

(30) Foreign Application Priority Data

Mar. 18, 2005    (KR)    ...................... 10-2005-0022852

(51) Int. Cl.
*G06F 1/16*    (2006.01)

(52) U.S. Cl. ................ 361/679.01; 16/342; 361/679.21

(58) Field of Classification Search ................ 361/679, 361/681, 683, 679.21, 679.26, 679.27
See application file for complete search history.

(56) References Cited

U.S. PATENT DOCUMENTS

| | | | | |
|---|---|---|---|---|
| 5,497,296 A * | 3/1996 | Satou et al. | .................. | 361/681 |
| 5,768,095 A * | 6/1998 | Nakamura et al. | .......... | 361/681 |
| 5,963,421 A * | 10/1999 | Moss et al. | .................. | 361/681 |
| 6,373,689 B1 * | 4/2002 | Yim | ........................... | 361/681 |
| 6,421,231 B1 * | 7/2002 | Jung | ........................... | 361/681 |
| 6,498,718 B1 * | 12/2002 | Kim et al. | .................... | 361/680 |
| 6,618,240 B1 * | 9/2003 | Kim | ........................... | 361/681 |
| 6,619,973 B2 * | 9/2003 | Perino et al. | ................. | 439/327 |
| 6,678,152 B2 * | 1/2004 | Kim | ....................... | 361/679.21 |
| 6,697,250 B2 * | 2/2004 | Kuo | ........................... | 361/681 |
| 6,741,298 B1 * | 5/2004 | Won | ............................ | 349/58 |
| 6,826,863 B1 * | 12/2004 | Goodfellow | ................. | 40/725 |
| 6,989,986 B2 * | 1/2006 | Kumagai et al. | ........ | 361/679.27 |
| 7,050,295 B2 * | 5/2006 | Kang | .......................... | 361/683 |
| 7,178,201 B2 * | 2/2007 | Lee et al. | ....................... | 16/342 |
| 7,248,463 B2 * | 7/2007 | Bander et al. | .......... | 361/679.27 |
| 7,336,503 B2 * | 2/2008 | Yang et al. | ................... | 361/801 |
| 7,508,654 B2 * | 3/2009 | Lee et al. | ....................... | 315/85 |
| 2004/0061997 A1 * | 4/2004 | Skinner | ....................... | 361/683 |
| 2005/0036284 A1 * | 2/2005 | Kang | .......................... | 361/683 |
| 2005/0105259 A1 * | 5/2005 | Lee et al. | ..................... | 361/681 |
| 2005/0168924 A1 * | 8/2005 | Wu et al. | ..................... | 361/683 |

\* cited by examiner

*Primary Examiner*—Lisa Lea-Edmonds
(74) *Attorney, Agent, or Firm*—KED & Associates, LLP

(57) ABSTRACT

Embodiments of a fastener and a display of a portable computer using the same and methods thereof can reduce a thickness, cost or weight of a display panel. The fastener can include at least a pair of columns spaced apart from each other, a connection for connecting the pair of columns, and first and second catching jaws that can be formed on different portions of the fastener (e.g., lateral sides) such that a part to be coupled can be caught thereto. The first and second catching jaws can be separated by a prescribed height. A front and rear case of a display of a portable computer include a catching hook and the fastener, respectively, so an inverter or the like can be secured in the display.

14 Claims, 4 Drawing Sheets

FASTENER AND DISPLAY OF PORTABLE COMPUTER USING THE SAME

BACKGROUND OF THE INVENTION

1. Field of the Invention

The present invention relates to a fastener and a portable computer using the same.

2. Background of the Related Art

FIG. 1 is a partially cutaway perspective view of a major portion of a related art portable computer. As shown in FIG. 1, a front case is partially cut away.

Referring to the figure, a keyboard 3 is provided on a rear portion of an upper surface of a main body 1 of the portable computer. A touch pad 5 is provided on a front portion of the upper surface of the main body 1 of the portable computer. A variety of parts of the portable computer, including a main board, are installed within the main body 1 of the portable computer.

A display 7 is pivotably connected to a rear end of the main body 1 through hinges 6. The display 7 operates to be folded on the upper surface of the main body 1 and unfolded at a predetermined angle with respect to the main body.

An external appearance of the display 7 is defined by a rear case 8 and a front case 9. The rear case 8 defines a rear appearance of the display 7, and the front case 9 defines a front edge appearance of the display.

The display 7 is provided with a liquid crystal panel 10. The liquid crystal panel 10, on which a variety of information is displayed, is provided in the display 7 and exposed to the front of the display 7 through the central opening of the front case 9. An edge of the liquid crystal panel 10 is closed by the front case 9.

To couple the rear case 8 and the front case 9 to each other, fastening holes 9' are formed in the front case 9 and case fastening bosses 12 are formed on an inner surface of the rear case 8 at positions corresponding to the fastening holes 9', respectively. A female thread is formed on an inner diameter portion of the case fastening boss 12. Further, a plurality of hooks 13 are used together when coupling the rear case 8 and the front case 9 with each other. For example, the plurality of hooks 13 are formed on a peripheral edge of the front case 9, and a plurality of catching jaws 13' to which the hooks are caught are provided on a peripheral edge of the rear case 8.

Next, an inverter 14 that is a part for driving the liquid crystal panel 10 is installed at a position on the display 7, which is adjacent to the main body 1. The inverter 14 is fixed to an inner surface of the rear case 8. To fix the inverter 14 to the display 7, inverter fastening bosses 16 are formed on the rear case 8 and holes are formed in the inverter 14 at positions corresponding to the inverter fastening bosses 16. Thus, screws are fastened to the inverter fastening bosses 16 through the holes, so that the inverter 14 is fixed to the rear case 8.

However, as described above the related art portable computer has various disadvantages or problems. For example, the case fastening bosses 12 are formed on the rear case 8 to couple the rear and front cases 9 and 8 of the display 7 with each other, and the inverter fastening bosses 16 are formed on the rear case 8 to fix the inverter 14 to the rear case 8. Since the fastening bosses 12 and 16 should be formed on the rear case 8 as described above, a relatively large space is needed. Accordingly, the width of a portion of the front case 9 in which the inverter 14 is installed can become large and can be an obstacle in making the portable computer light and compact. Further, as shown in FIG. 1, the hooks 13 engage to the catching jaws 13' of the rear case 8 such that the rear case 8 and the front case 9 are coupled to each other. Thus, if additional parts are to be mounted to the rear or front case 8 or 9, additional hooks 13, catching jaws 13' and bosses 12 and 16 should be further formed. Accordingly, making the display 7 light and compact can be difficult because of a large number of fastening bosses or hooks are formed in the inner space of the display 7.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the invention is to provide a portable computer and a fastener for the same that can solve at least the above problems and/or disadvantages and to provide at least the advantages described hereinafter.

An object of the invention is to provide a fastener capable of coupling at least two parts simultaneously.

Another object of the invention is to provide a display of a portable computer using a fastener capable of coupling at least two parts.

Another object of the invention is to provide a display of a portable computer using a fastener capable of coupling at least two parts that can reduce or minimize a size of a structure coupling the two parts.

Another object of the invention is to provide a display of a portable computer using a fastener capable of coupling at least two parts that can reduce a thickness of a display panel.

Another object of the invention is to provide a display of a portable computer using a fastener capable of coupling at least two parts that can reduce cost or simplify a mold structure for forming the display.

To achieve at least the above objects in a whole or in part, in accordance with one aspect of the invention, there is provided a fastener that includes a pair of columns spaced apart from each other, a connection portion configured to connect the pair of columns and first and second catching jaws on sides of the connection portion, respectively, wherein each of the first and second catching jaw has at least one engaging surface.

To further achieve at least the object objects in a whole or in part, in accordance with one aspect of the invention, there is provided a device that includes a display panel, a rear case provided with at least one fastener, wherein the fastener includes at least one column coupled to the rear case and first and second catching jaws positioned at different levels separated by a predetermined distance, a front case coupled to the rear case, wherein display panel is configured to be exposed in the front case, and wherein the front case has a catching hook configured to catch the second catching jaw of the fastener, and a device mounted to the rear case by a edge configured to engage the first catching jaw of the fastener.

To further achieve at least the above objects in a whole or in part, in accordance with one aspect of the invention, there is provided a device that includes a display, a first case provided with at least one fastener unit for fastening, wherein the fastener unit includes at least one column, connection unit for protruding from the at least one column, and first and second engagement units for engaging, wherein the first and second engagement units are positioned at sides of the fastener unit, a second case coupled to the first case, wherein the display is configured to be exposed in the second case, and wherein the second case has catching hook unit for catching the second engagement unit of the fastener unit, and a device mounted to the rear case by a portion configured to engage the first engagement unit of the fastener unit.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
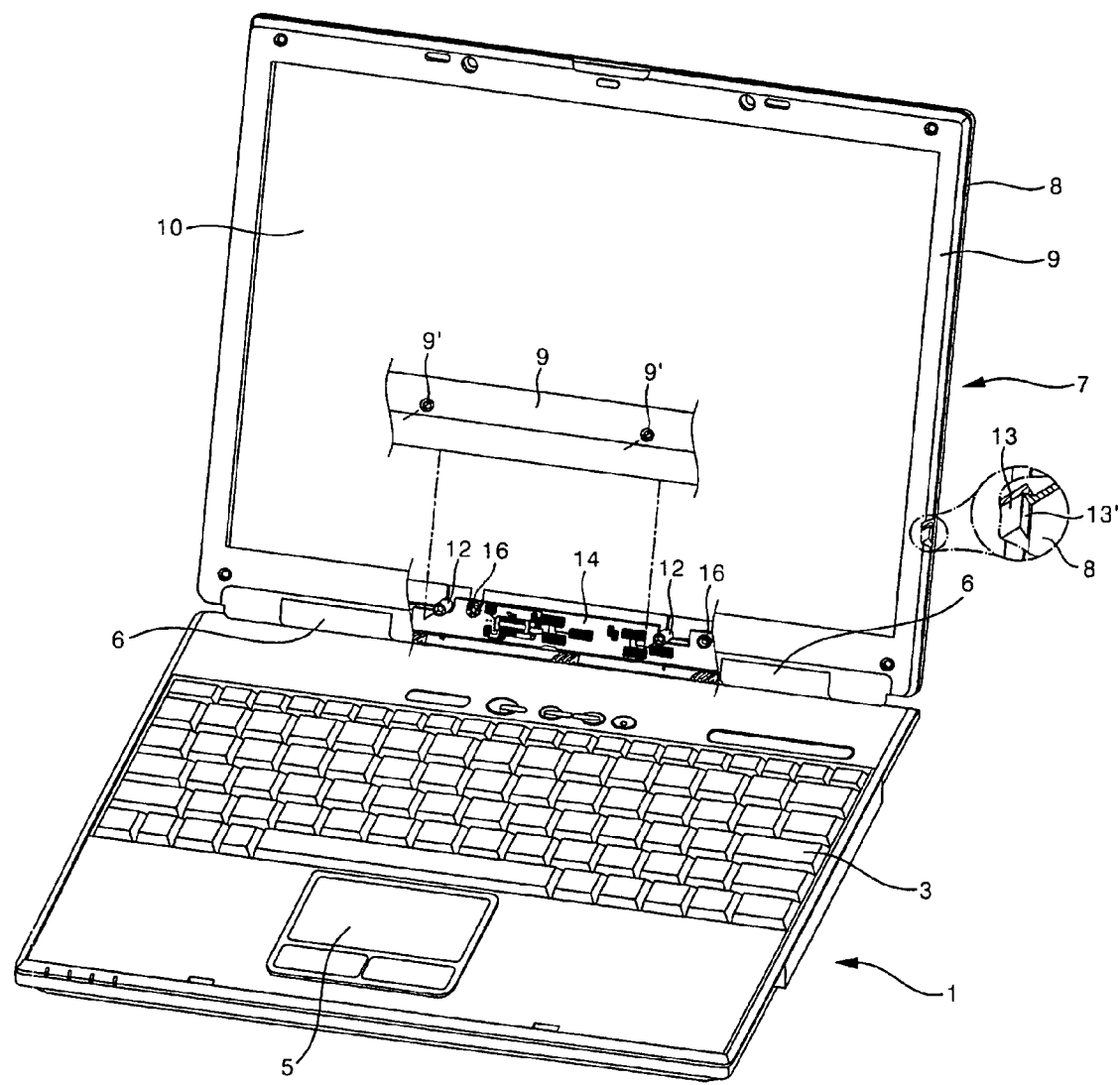
FIG. 1 is a diagram showing partially cutaway perspective view of a related art portable computer.
Figure 2:
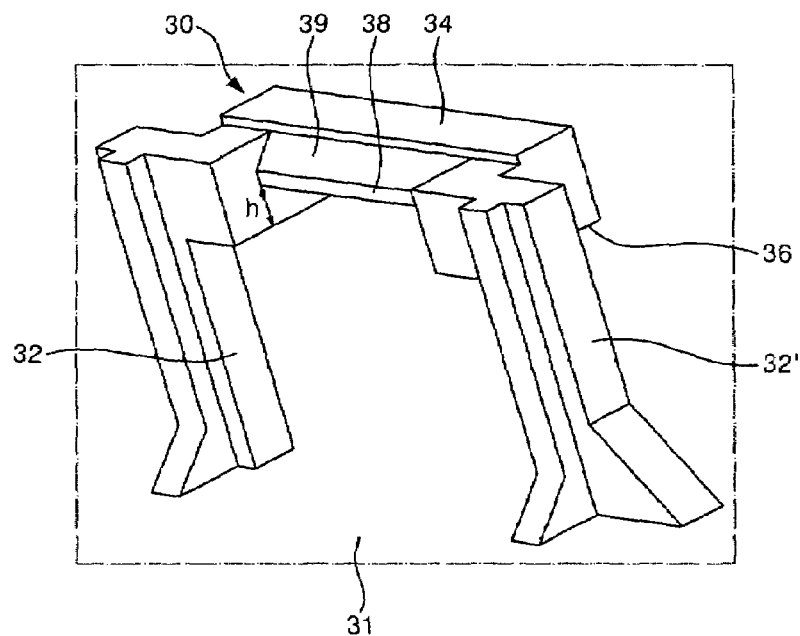
FIG. 2 is a diagram showing a perspective view of a preferred embodiment of a fastener according to the present invention.
Figure 3:
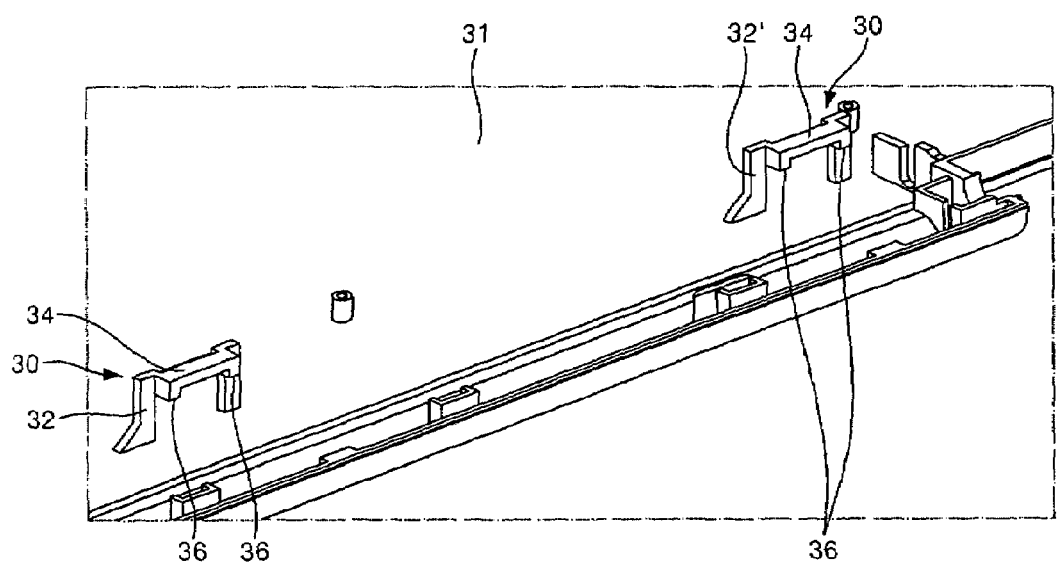
FIG. 3 is a diagram showing a perspective view of a fastener shown in FIG. 2 positioned at a rear case of a display.

FIG. 2 is a diagram showing a perspective view of an embodiment of a fastener according to the invention. FIG. 3 is a perspective view showing that the fastener of FIG. 2 can be formed on or coupled to a case (e.g., rear case) of a portable computer display.

As shown in FIGS. 2 and 3, a fastener 30 can be formed upright on a fixing portion 31. The fixing portion 31 can be one of parts coupled by the fastener 30 and can correspond to a rear case 40 of the display. However, the invention is not intended to be so limited.

The fastener 30 can be provided with first and second columns 32 and 32' that are spaced apart by a predetermined gap from each other and stand upright on a surface of the fixing portion 31. The first and second columns 32 and 32' preferably extend in parallel with each other.

The first and second columns 32 and 32' can protrude from the surface of the fixing portion 31 up to a predetermined height. A connection portion 34 can connect the first and second columns 32 and 32'. For example, the connection portion 34 can transversely extend between upper ends of the columns 32 and 32'. The connection portion 34 can be formed to protrude from side surfaces of the columns 32 and 32' adjacent to upper surfaces thereof.

The connection portion 34 can be formed with first catching jaws 36. However, the invention is not intended to be so limited. The first catching jaws 36 can be formed on a lower surface of both ends of the connection portion 34, respectively. A prescribed part can be inserted and then caught into a space between the surface of the fixing portion 31 and the first catching jaws 36, e.g., the lower surface of the connection portion 34.

For example, a prescribed part that can be inserted and then caught into the space between the lower surface of the connection portion 34 and the surface of the fixing portion 31 can include an inverter for driving a backlight of a liquid crystal panel, a wireless module such as a wireless LAN and Bluetooth, an antenna for driving the wireless module, a connector for the mounting of a variety of external devices, an illumination lamp, a camera, and the like. However, the invention is not intended to be so limited.

The connection portion 34 can include a second catching jaw 38. However, the invention is not intended to be so limited. The second catching jaw 38 can be positioned opposite to the first catching jaws 36 and formed at a level different from the first catching jaws 36 by a predetermined height "h." For example, the second catching jaw 38 can be positioned higher than the first catching jaws 36 by the height "h" from the surface of the fixing portion 31. The second catching jaw 38 can also be formed on a side of the connection portion 34, but is preferably located at a level different from the first catching jaws 36 by the predetermined height h.

In addition, the first catching jaws 36 can be positioned on both ends of the lower surface of the connection portion 34, whereas the second catching jaw 38 can be positioned on the side of the connection portion between the first catching jaws 36. Preferably, the parts caught to the catching jaws 36 and 38 do not interfere with each other. Since the first catching jaws 36 and the second catching jaw 38 can be provided on both lateral sides of the connection portion 34, the parts caught to the catching jaws 36 and 38 do not interfere with each other.

An inclined guide surface 39 can be positioned to have a prescribed relationship to the second catching jaw 38. The inclined guide surface 39 can be formed on one of the lateral sides of the connection portion 34 on which the second catching jaw 38 can be formed. The inclined guide surface 39 can serve to guide a hook of a part to be caught to the second catching jaw 38.

Figure 4:
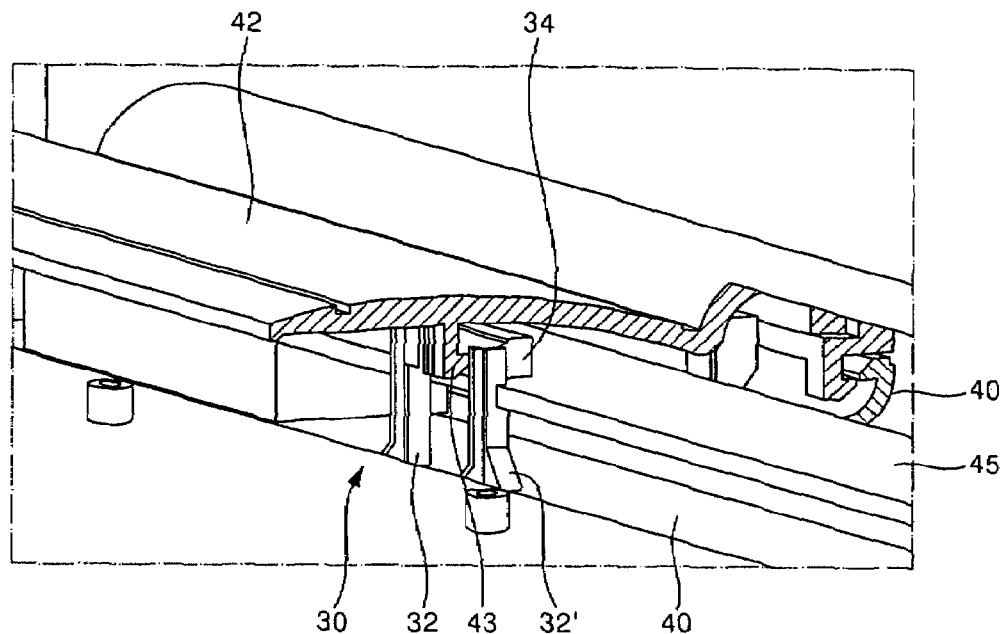
FIG. 4 is a diagram showing a partial sectional perspective view of a preferred embodiment of a display of a portable computer according to the present invention.
Figure 5:
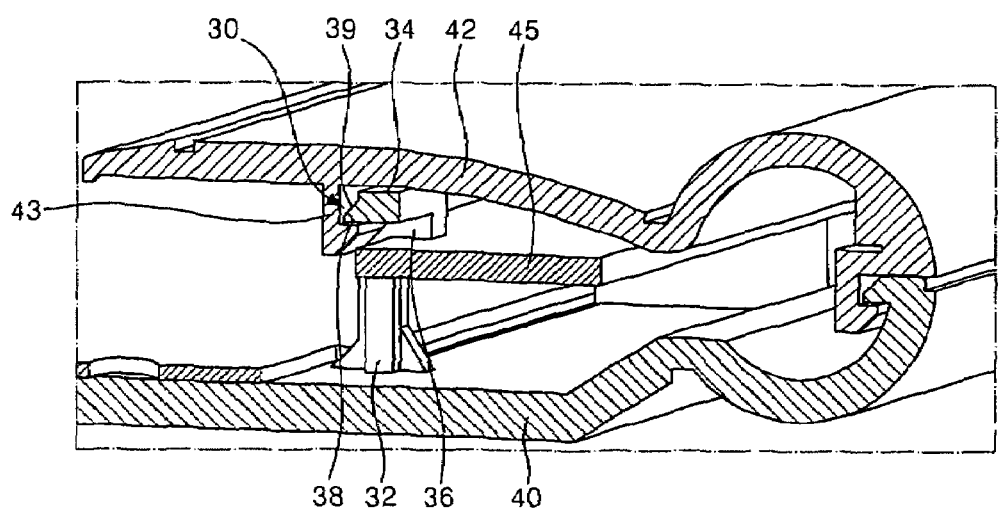
FIG. 5 is a diagram showing a partial sectional perspective view illustrating a major portion of the display shown in FIG. 4 according to the present invention.
Figure 6:
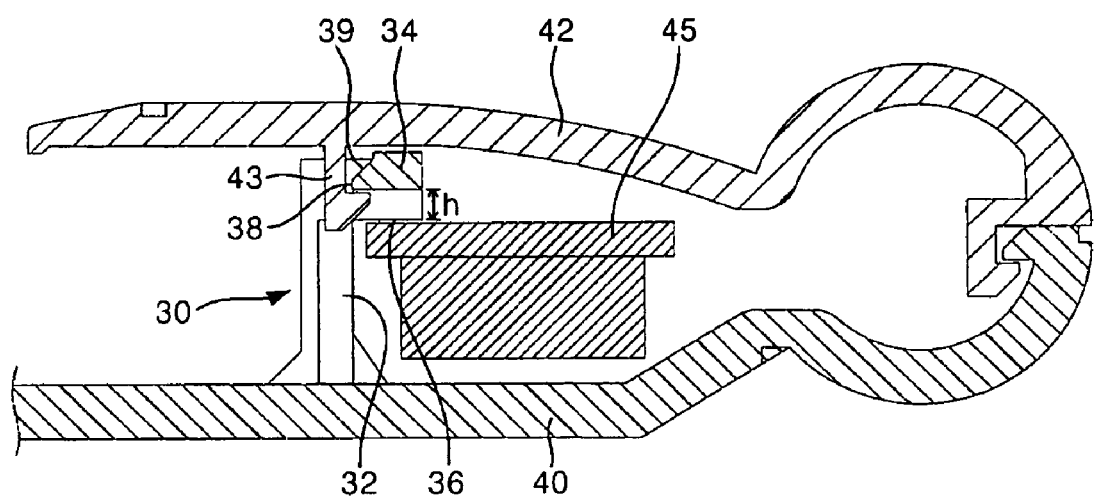
FIG. 6 is a diagram showing a sectional view of the display shown in FIG. 4 according to the present invention.

FIG. 4 is a diagram showing a partial sectional perspective view showing a embodiment of a display of a portable computer according to the present invention, and FIG. 5 is a partial sectional perspective view illustrating a major portion of the embodiment of the display as shown in FIG. 4. FIG. 6 is a diagram showing a sectional view of the embodiment of the display according to the invention.

A display shown in FIGS. 4 and 5 will now be described. A rear appearance of the display can be defined by the rear case 40. The fasteners 30 shown in FIG. 3 can be formed on or coupled to an inner surface of the rear case 40. A plurality of the fasteners 30 can be formed at various positions according to design conditions.

A front case 42 can define an edge of a front surface of the display. To this end, the front case 42 can be formed with or include a plurality of catching hooks 43. The catching hooks 43 can be on a rear surface of the front case 42.

In one embodiment of the invention, only the fasteners 30 and the catching hooks 43 are preferably used to couple the rear case 40 and the front case 42 with each other. However, the invention is not intended to be so limited. For example, if there is a sufficient free space, fastening bosses for screw fastening can be formed, and further, related art hooks and catching jaws may also be used, according to the design conditions. However, if free space is lacking, the fasteners 30 can be used.

For example, when an inverter 45 for controlling a display panel is mounted between the rear case 40 and the front case 42, the fastener 30 can be used. In one embodiment, an edge of the inverter 45 can be caught to the first catching jaws 36 of the fastener 30, and the catching hooks 43 formed on the inner surface of the front case 42 can be caught to the second catching jaw 38.

Operations of the fastener according to embodiments of the invention and the display of a portable computer using the same will now be described. The operations will be described using and can be applied to the fastener shown in FIG. 2. However, the invention is not intended to be so limited.

First, the fastener 30 can be formed upright on the fixing portion 31 such as the rear case 40, and thus, an opening enclosed by the columns 32 and 32', the fixing portion 31 and the connection portion 34 can be formed. The opening can be a portion through which a slide is removed from a mold, and have an important function in the mold used in manufacturing the fastener 30.

For example, the connection portion 34 for connecting the columns 32 and 32' with each other can protrude from the side surfaces of the upper portions of the columns 32 and 32', the first catching jaws 36 can be formed at both longitudinal ends of the connection portion 34, and the second catching jaw 38 can be on a lateral side of the connection portion 34 opposite to the first catching jaws 36. Thus, different parts can engage (e.g., be caught) and be coupled to the first catching jaws 36 and the second catching jaw 38 of the single fastener 30, respectively.

Operations whereby the fastener 30 can couple the front and rear cases 42 and 40 defining the display of a portable computer and simultaneously mount the inverter 45 to the rear case 40 will now be described.

A portion of the edge of the inverter 45 can be caught by the first catching jaws 36 of the fastener 30. At this time, the inverter 45 can be caught to the first catching jaws 36 in a state where the columns 32 and 32' are slightly elastically deformed. The inverter 45 can be fastened to the rear case 40 using at least one screw in addition to the first catching jaws 36 of the fastener 30. The number of the fasteners 30 used herein may vary according to the size of the inverter 45.

The rear case 40 is positioned such that the inner surface thereof is exposed upwardly, and the front case 42 is placed over the rear case 40. If the front case 42 is placed at the position corresponding to the rear case 40 and then pressed down toward the rear case in such a state, the catching hooks 43 can be slightly elastically deformed while they are guided along the guide surface 39 of the fastener 30. After the catching hooks 43 pass along the guide surface 39, the catching hooks 39 can be caught to the second catching jaw 38, and the catching hooks 43 can be restored to an original state.

Accordingly, both the inverter 45 and the catching hooks 43 of the front case 42 can be simultaneously coupled to the fastener 30. Therefore, the fastener 30 causes the front case 42 and the rear case 40 to be coupled with each other and the inverter 45 to be securely mounted to the rear case 40. Thus, the rear and front cases 40 and 42 can be coupled with each other using the fastener 30.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a fastener, methods for using the same and a display of a portable computer using the same, have various advantages. For example, a single fastener may be utilized to couple two parts simultaneously. Therefore, since the single fastener can be manufactured and used to couple a plurality of parts, there is an advantage in that a space in which the fastener is provided can be more efficiently utilized. Further, since the number of the fasteners can be reduced when a part including the fasteners is manufactured, it is possible to simplify its mold structure. Therefore, the design of the mold can be simplified, and thus, the manufacturing costs can also be reduced. In addition, since different forces are applied to the fastener in different directions in a state where the parts are completely assembled to the first and second catching jaws of the fastener, there is also an advantage in that the breakage of the fastener because of impact and the like can be reduced.

The scope of the present invention is not limited to embodiments described and illustrated above but is defined by the appended claims. It will be apparent to those skilled in the art that various modifications and changes can be made thereto within the scope of the invention defined by the claims.

For example, in one illustrated embodiment, the first catching jaws 36 are placed at the positions other than between the columns 32 and 32', and the second catching jaw 38 is positioned between the columns 32 and 32'. However, according to the positions of the catching hooks 43 of the part to be coupled, the second catching jaw 38 may be placed at the position other than between the columns 32 and 32', e.g., at the position other than between the columns 32 and 32' opposite to the first catching jaws 36. Further, the second catching jaw 38 can include a plurality of disconnected or non-continuous surfaces on one or more sides of the fastener 30.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A fastener, comprising:
   a pair of columns spaced apart from each other;
   a connection portion that extends between corresponding ends of the pair of columns;
   a pair of first catching jaws provided at opposite ends of a first longitudinal side surface of the connection portion, positioned corresponding to the pair of columns; and
   a second catching jaw formed on an intermediate portion of a second longitudinal side surface of the connection portion, wherein each of the first and second catching jaws has at least one engaging surface.

2. The fastener of claim 1, wherein the pair of first catching jaws and the second catching jaw of the connection portion are positioned at different levels on the connection portion and are separated by a predetermined distance.

3. The fastener of claim 2, wherein the pair of first catching jaws and the second catching jaw do not overlap longitudinally on the connection portion.

4. The fastener of claim 1, further comprising an inclined guide surface provided on a portion of the connection portion corresponding to at least one of the pair of first catching jaws or the second catching jaw.

5. The fastener of claim 4, wherein the inclined guide surface is provided on one lateral side of the connection portion so as to guide a part into the second catching jaw.

6. The fastener of claim 1, wherein respective engaging surfaces of the pair of first catching jaws and the second catching jaw are parallel to each other and are separated by a predetermined distance.

7. The fastener of claim 1, wherein the pair of first catching jaws and the second catching jaw overlap each other in a longitudinal direction of the connection portion.

8. The fastener of claim 1, wherein the pair of columns are elastically deformable.

9. The fastener of claim 1, wherein at least one of the pair of first catching jaws is configured to engage an inverter that drives a backlight, a wireless module, an antenna, a connector configured to receive a plurality of external devices, an illumination lamp or a camera.

10. The fastener of claim 1, wherein the pair of columns extend upright from a fixing portion and in parallel to each other, and wherein the fastener simultaneously couples three different parts together.

11. A device, comprising:
a display panel;
a rear case provided with at least one fastener, wherein the fastener comprises:
a pair of columns coupled to the rear case;
a connection portion that extends between corresponding ends of the pair of columns; and
first and second catching jaws positioned at different levels relative to the pair of columns and separated by a predetermined distance, wherein the first and second catching jaws extend along different longitudinal side surfaces of the connection portion, and, wherein the first catching jaw comprises a pair of first catching jaws provided at opposite longitudinal ends of the connection portion corresponding to the pair of columns, and the second catching jaw is formed on an intermediate portion of the connection portion;
a front case coupled to the rear case, wherein display panel is configured to be exposed in the front case, and wherein the front case has a catching hook configured to catch the second catching jaw of the fastener; and
a device mounted to the rear case by an edge that is configured to engage the first catching jaw of the fastener.

12. The display of claim 11, wherein the device is an inverter configured to drive a backlight of a liquid crystal panel, a wireless module, an antenna, a connector configured to mount a plurality of external devices, an illumination lamp or a camera.

13. The display of claim 11, further comprising an inclined guide surface provided on a portion of the connection portion corresponding to at least one of the pair of first catching jaws or the second catching jaw.

14. A device, comprising:
a display panel;
a rear case provided with at least one fastener, wherein the fastener comprises:
a plurality of columns connected together by a connection portion, the plurality of columns being coupled to the rear case; and
first and second catching jaws positioned at different levels and separated by a predetermined distance, wherein the first catching jaws are positioned at opposite longitudinal ends of the connection portion, and the second catching jaw is formed on an intermediate portion of the connection portion;
a front case coupled to the rear case, wherein display panel is configured to be exposed in the front case, and wherein the front case has a catching hook configured to catch the second catching jaw of the fastener; and
a device mounted to the rear case by a edge configured to engage the first catching jaw of the fastener.

* * * * *